US006826161B1

United States Patent
Shahidi et al.

(10) Patent No.: US 6,826,161 B1
(45) Date of Patent: Nov. 30, 2004

(54) SLEWING DETECTOR SYSTEM AND METHOD FOR THE INTRODUCTION OF HYSTERESIS INTO A HARD HANDOFF DECISION

(75) Inventors: Reza Shahidi, San Diego, CA (US); Octavio Jose De Franca Lima, San Diego, CA (US); Jen M. Chen, San Diego, CA (US); Long L. Duan, San Diego, CA (US); Tom T. Sesnic, Niwot, CO (US)

(73) Assignee: Telefonaktiebolaget LM Ericsson (publ) (SE)

( * ) Notice: Subject to any disclaimer, the term of this patent is extended or adjusted under 35 U.S.C. 154(b) by 328 days.

(21) Appl. No.: 09/620,374

(22) Filed: Jul. 20, 2000

(51) Int. Cl.$^7$ .............................. H04Q 7/20; H04J 3/06; H04B 7/216
(52) U.S. Cl. ..................... 370/331; 370/333; 370/350; 370/335; 455/439; 455/443
(58) Field of Search ................................ 370/331–335, 370/341–342, 441, 350, 503, 504, 507, 515, 518, 520, 508, 337, 338; 455/436–444, 12.1, 13.2

(56) References Cited

U.S. PATENT DOCUMENTS

| 5,379,447 | A |   | 1/1995  | Bonta et al. ............... 455/33.2 |
| 5,483,669 | A |   | 1/1996  | Barnett et al. ............. 455/33.2 |
| 5,722,072 | A |   | 2/1998  | Crichton et al. ............ 455/437  |
| 5,848,063 | A |   | 12/1998 | Weaver, Jr. et al. ........ 370/331   |
| 5,917,811 | A |   | 6/1999  | Weaver, Jr. et al. ........ 370/332   |
| 5,926,470 | A |   | 7/1999  | Tiedemann, Jr. ............ 370/334   |
| 5,974,318 | A |   | 10/1999 | Satarasinghe ............... 455/436  |
| 6,014,376 | A | * | 1/2000  | Abreu et al. ................ 370/350 |
| 6,016,322 | A | * | 1/2000  | Goldman ..................... 370/508  |
| 6,026,301 | A | * | 2/2000  | Satarasinghe ............... 455/436  |
| 6,075,990 | A | * | 6/2000  | Shin .......................... 455/440 |
| 6,141,554 | A | * | 10/2000 | Choi .......................... 455/436 |
| 6,141,559 | A | * | 10/2000 | Neumiller et al. .......... 455/525   |
| 6,154,652 | A | * | 11/2000 | Park et al. .................. 455/437 |
| 6,194,970 | B1 | * | 2/2001 | Nielsen et al. ................ 331/16 |
| 6,208,631 | B1 | * | 3/2001 | Kim ........................... 370/332  |
| 6,208,871 | B1 | * | 3/2001 | Hall et al. .................. 455/517  |
| 6,229,792 | B1 | * | 5/2001 | Anderson et al. ........... 370/336   |
| 6,246,673 | B1 | * | 6/2001 | Tiedemann, Jr. et al. ... 370/333    |
| 6,307,840 | B1 | * | 10/2001 | Wheatley, III et al. ..... 370/350   |
| 6,321,090 | B1 | * | 11/2001 | Soliman ..................... 455/440  |
| 6,542,743 | B1 | * | 4/2003 | Soliman ..................... 455/436  |
| 6,600,728 | B1 | * | 7/2003 | Choi .......................... 370/335 |
| 6,671,265 | B1 | * | 12/2003 | Hwang et al. ............... 370/331  |

FOREIGN PATENT DOCUMENTS

| EP | 0897251 A2 | 2/1999 |
| WO | WO9937037 A | 7/1999 |

* cited by examiner

*Primary Examiner*—Hanh Nguyen
(74) *Attorney, Agent, or Firm*—Coats & Bennett, P.L.L.C.

(57) ABSTRACT

A method for introducing hysteresis into a hard handoff decision in code division multiple access (CDMA) communications following an initial hard handoff is provided. The method introduces hysteresis when it is determined that the communicating mobile station system clock is slewing. The slewing determination follows from a calculation of the rate of change in the round trip delay (RTD) in communications with the mobile station. A calculated RTD rate of change is compared with a RTD slewing threshold, where the RTD threshold is the assumed slew rate of the mobile station. Hard handoffs are suspended as long as the calculated RTD rate of change exceeds the RTD slewing threshold. A system and apparatus to implement the above-described method are also provided.

32 Claims, 6 Drawing Sheets

SLEWING DETECTOR SYSTEM AND METHOD FOR THE INTRODUCTION OF HYSTERESIS INTO A HARD HANDOFF DECISION

BACKGROUND OF THE INVENTION

1. Field of the Invention

This invention relates generally to the field of wireless communications and, more particularly, to the introduction of hysteresis into the hard handoff of a mobile station between cells, in response to measuring round trip delay in communications with the mobile station.

2. Description of the Related Art

As is well understood in the code division multiple access (CDMA) IS-95A/B and IS-2000 standards, a so-called soft handoff permits simultaneous transmissions between a mobile station and two or more base stations or cells. Thus, as a mobile station communicates in a boundary area between cells, a hard handoff decision need not be made to transfer the mobile station communications exclusively to either one cell or the other. Hard handoffs, such as used in frequency division multiple access (FDMA) as described by the advanced mobile phone service (AMPS, EIA/TIA-553), often result in a system instabilities. In the AMPS system, a decision to handoff is based upon signal strength. When a base station detects signal strengths below a predetermined threshold in communications with a mobile station, the system locates another base station where the mobile station signals are detected at a level above the threshold, and the mobile station's call is transferred to that base station.

Because of changes in signal strength due to the mobile station's change of position or obstacles in the signal path, the system may direct that the mobile station undergo a series of hard handoffs in a short period of time. This "ping-pong" effect increases system overhead and often results in a call to the mobile station being dropped. The soft handoff largely eliminates the problems associated with having to make such a hard handoff decision.

However, even in CDMA communications, hard handoffs are still required in some situations, such as when the mobile must change from CDMA to analog modulation, or when the mobile station crosses a boundary between two different carriers (service providers). As is well known in the art, there are two fundamental methods of managing a hard handoff in CDMA communications; using pilot symbols or round trip delay (RTD) to make the transfer decision. In the pilot symbols method, the mobile station measures the signal strength of the pilot symbols transmitted by neighboring base stations. The signal strength of the pilot symbols are compared, and handoff decisions are made by the system in response to these measurements. However, this method requires additional transmitter equipment to generate the pilot symbols, mobile station processing time to make the measurements, and overhead to communicate the measurements to the system through the base stations.

The RTD system requires that the base stations measure the RTD of their communications with a mobile station. An assumption is made that the base station with the smallest RTD is closest to the mobile station. Using the RTD measurements of the neighboring base stations, the system can make a determination of which base station is most likely to remain in communication with the mobile station, and a hard handoff results from this analysis.

Figure 1:
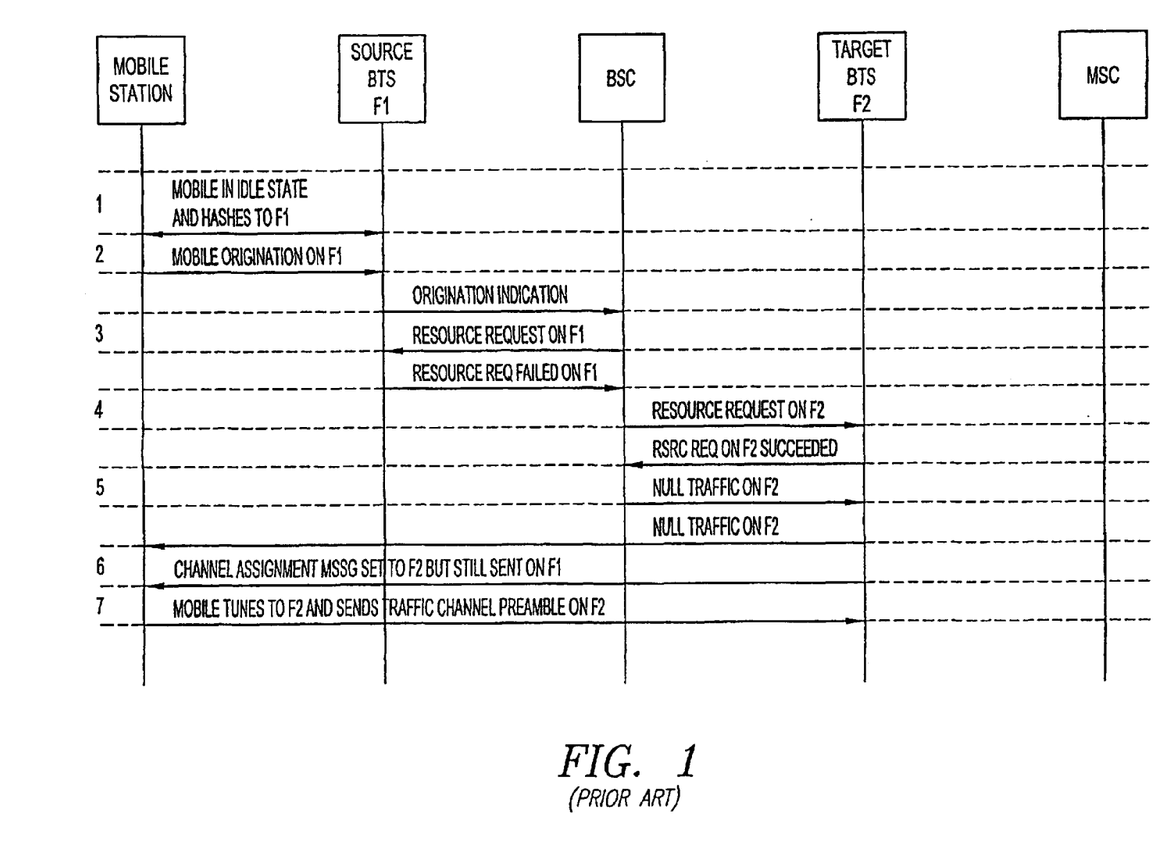
FIG. 1 illustrates a hard handoff based upon an RTD triggering mechanism (prior art).

FIG. 1 illustrates a hard handoff based upon an RTD triggering mechanism (prior art). When a mobile station is in the traffic state (a call is in progress), a hard handoff is triggered as soon as the RTD measurement among the active CDMA channels is greater than a predetermined RTD threshold.

The mobile station is shown being served by a CDMA channel {Cell1,F1} right before the trigger. The hard handoff is triggered as soon as the mobile station's RTD crosses the RTD threshold for CDMA channel {Cell1,F1}. The CDMA channel that causes the hard handoff trigger is called the trigger CDMA channel. In this case, the CDMA channel {Cell1,F1} is the trigger CDMA channel and the system uses the information in the target list of this CDMA channel to determine the next step in hard handoff processing that is hard handoff type determination.

The RTD method of triggering advantageously requires no additional equipment. The disadvantage is that inaccuracies in RTD measurement may cause premature or late triggering. To achieve the required hard handoff reliability with this triggering mechanism, the system must be designed with more overlap between border sites for cross-carrier hard handoff. Alternately, the system can trigger sooner, which implies not using the capacity and coverage of the border CDMA channels to their full extent.

Figure 2:
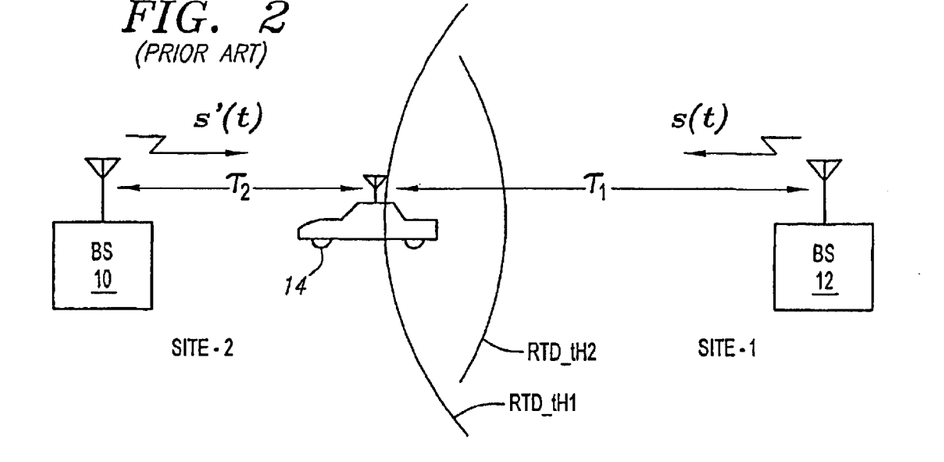
FIG. 2 illustrates a well known problem associated with the use of the RTD hard handoff triggering method (prior art).

FIG. 2 illustrates a well known problem associated with the use of the RTD hard handoff triggering method (prior art). It is assumed that the RTD threshold from a second base station 10 (RTD_TH2) is equal to one-half times the RTD threshold of a first base station 12 (RTD_TH1). That is, 2(RTD_TH2)=(RTD_TH1). For a mobile station 14 moving from Site-1, associated with first base station 12, to Site-2, associated with the second base station 10, the hard handoff triggers when $2\tau_1$=RTD_TH$_1$. At a time right before the hard handoff (HHO) trigger, the mobile station 14 transmits the signal S(t) at S(t−RTD_TH$_1$/2). At a time right after the HHO trigger, the mobile station 14 transmits the signal S'(t) at S'(t−RTD_TH$_1$/2). Despite the handoff from first base station 12 to the second base station 10, the mobile station 14 has timed its return communication with a delay associated with the receipt of communications from the first base station 12. Site-2 (second base station 10) receives the signal S'(t−RTD_TH$_1$/2) at S'(t−(RTD_TH$_1$/2+$\tau_1$)). As a result, the measured Round Trip Delay at Site-1 is equal to RTD_TH$_1$/2+$\tau_1$. Since 2(RTD_TH$_2$)=RTD_TH$_1$, the measured RTD at Site-2 is equal to (RTD_TH$_2$+$\tau_1$). Since this value is larger than the RTD threshold for Site-2, (RTD_TH$_2$), there is another trigger. This ping pong effect is not desirable.

The cause of the timing problem is the mobile station's time reference slewing. That is, the mobile does not change its time reference from Site-1 to Site-2 instantaneously. Even though the mobile station receives a communication from Site-2 at an earlier time, the mobile stations reply message is delayed as if the mobile station was replying to Site-1. Consequently, Site-2 perceives the mobile station as being further away than it actually is. The IS-95 and IS-2000 standards state that the time reference of the mobile station shall slew at a rate between 3/8 and 10/8 chips per second, where a chip refers to one bit in pseudorandom noise (PN) spreading code which occurs at the rate of 1.2288 mega chips per second (Maps).

It would be advantageous if the RTD method of performing a hard handoff included a hysteresis mechanism to be used while the mobile station system clock is slewing, following a hard handoff.

It would be advantageous if the mobile station's system clock slewing could be accounted for in determining a hard handoff using the RTD decision process.

It would be advantageous if hard handoffs were permitted as quickly as possible after the mobile station system clock stopped slewing.

SUMMARY OF THE INVENTION

In a CDMA cell base station subsystem, a method is provided for introducing hysteresis in a call handoff. Such a method can be implemented as software and machine-executable instructions which are stored in RAM, optical, electrical, or magnetic storage mediums. The method comprises: detecting instability in a mobile station (MS) system clock; and, in response to detecting the mobile station clock instability, suspending hard handoffs of the mobile station.

The hysteresis is introduced following the hand off of the mobile station from a first cell to a second cell. A base station in the second cell detects the mobile station system clock instability by measuring the slew rate of the mobile station system clock. Measuring the slew rate of the mobile station system clock includes: measuring the round trip delay (RTD) of a first message at a first time, from the second cell base to the mobile station; measuring the RTD of a second message at a second time, from the second cell base to the mobile station; calculating the difference between RTD measurements; and, calculating the RTD rate of change. Detecting the mobile station clock instability includes: setting a predetermined RTD rate of change threshold; and, suspending handoffs when the RTD rate of change calculation exceeds the RTD rate of change threshold.

Setting the RTD rate of change threshold also includes estimating the first slew rate of the mobile station. Then, detecting instability in the mobile station system clock includes: in response to calculating the RTD rate of change, calculating the mobile station measured slew rate; and, suspending the handoff of the mobile station includes suspending the handoff when the measured slew rate exceeds the first slew rate estimate.

A CDMA system for introducing hysteresis into call handoff is also provided. The system comprises a mobile station having a system clock for initiating message transmission in response to receiving messages. A cell base station includes a clock to measure message timing, a handoff circuit to negotiate mobile station handoffs with other cells, and a detector connected to the clock to detect instabilities in the mobile station system clock. The detector is connected to the handoff circuit, to suspend handing off the mobile station when instabilities are detected in the mobile station system clock.

The base station detector measures the slew rate of the mobile station system clock by measuring the RTD between messages. The detector calculates the difference between RTD measurements, and calculates the RTD rate of change. The cell base station detector signals the handoff circuit to suspend a handoff of the mobile station when the RTD rate of change calculation exceeds a predetermined RTD rate of change threshold. The mobile station system clock changes the system time at a first predetermined slew rate, and the RTD difference threshold includes accepting a first slew rate estimate. The detector measures the mobile station slew rate in response to calculating the RTD rate of change, and signals the handoff circuit to suspend a mobile station handoff when the measured slew rate exceeds the first slew rate estimate.

DETAILED DESCRIPTION OF THE PREFERRED EMBODIMENTS

Figure 3:
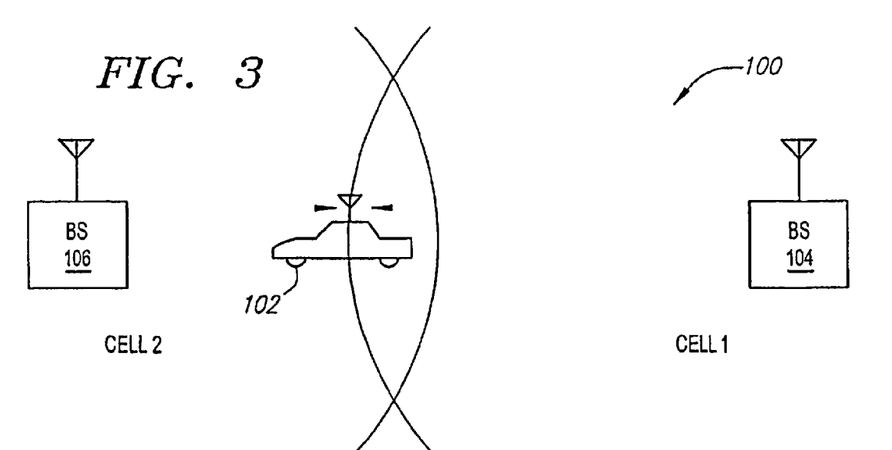
FIG. 3 is a schematic block diagram of the present invention code division multiple access (CDMA) communications system that introduces hysteresis into call handoffs.

FIG. 3 is a schematic block diagram of the present invention code division multiple access (CDMA) communications system that introduces hysteresis into call handoffs. The system 100 comprises a mobile station 102, a first cell with a base station 104, and a second cell with a base station 106. The system 100 introduces hysteresis into hard handoff situations immediately following an initial hard handoff. As mentioned above, this situation typically occurs when the mobile station is on the border between the cells of different carriers. Initially, the mobile station 102 has a call which is being serviced by the first cell base station 104. Then, a decision is made to make a hard handoff from the first cell base station 104 to the second cell base station 106. The decision making and triggering process is outside the scope of the present invention. It is more likely that the invention's hysteresis process will be used in a system where the hard handoff decision is made on the basis of RTD. However, hysteresis based on RTD can be introduced into the hard handoff decision process, regardless of how the initial hard handoff decision is made. The description of FIG. 2, above, illustrates one method of making coming an initial hard handoff decision.

Once the initial hard handoff decision is made, so that second cell base station 106 communicates with mobile station 102, the second cell base station 106 activates circuitry to introduce a delay into subsequent hard handoff decisions. As described below, this circuitry detects instability in the system clock of the mobile station 102.

Figure 4:
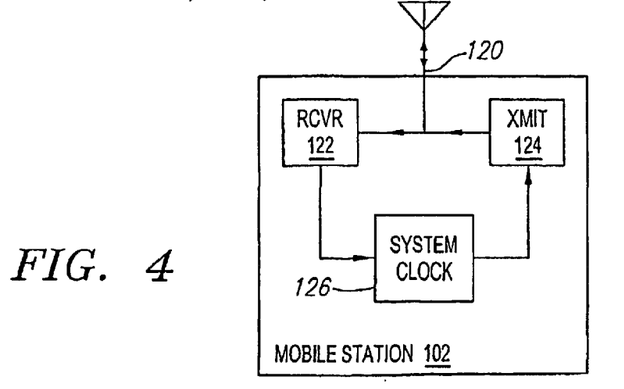
FIG. 4 is a more detailed depiction of the mobile station of FIG. 3.

FIG. 4 is a more detailed depiction of the mobile station 102 of FIG. 3. The mobile station (MS) 102 has a port on line 120 connected to a receiver 122 and a transmitter 124 for the communication of messages. These messages include a call conducted on a traffic channel, as well as control and synchronization channels. The mobile station has a system clock 126 connected to the transmitter 124 and receiver 122 for initiating message transmissions that are responsive to received messages.

Figure 5:
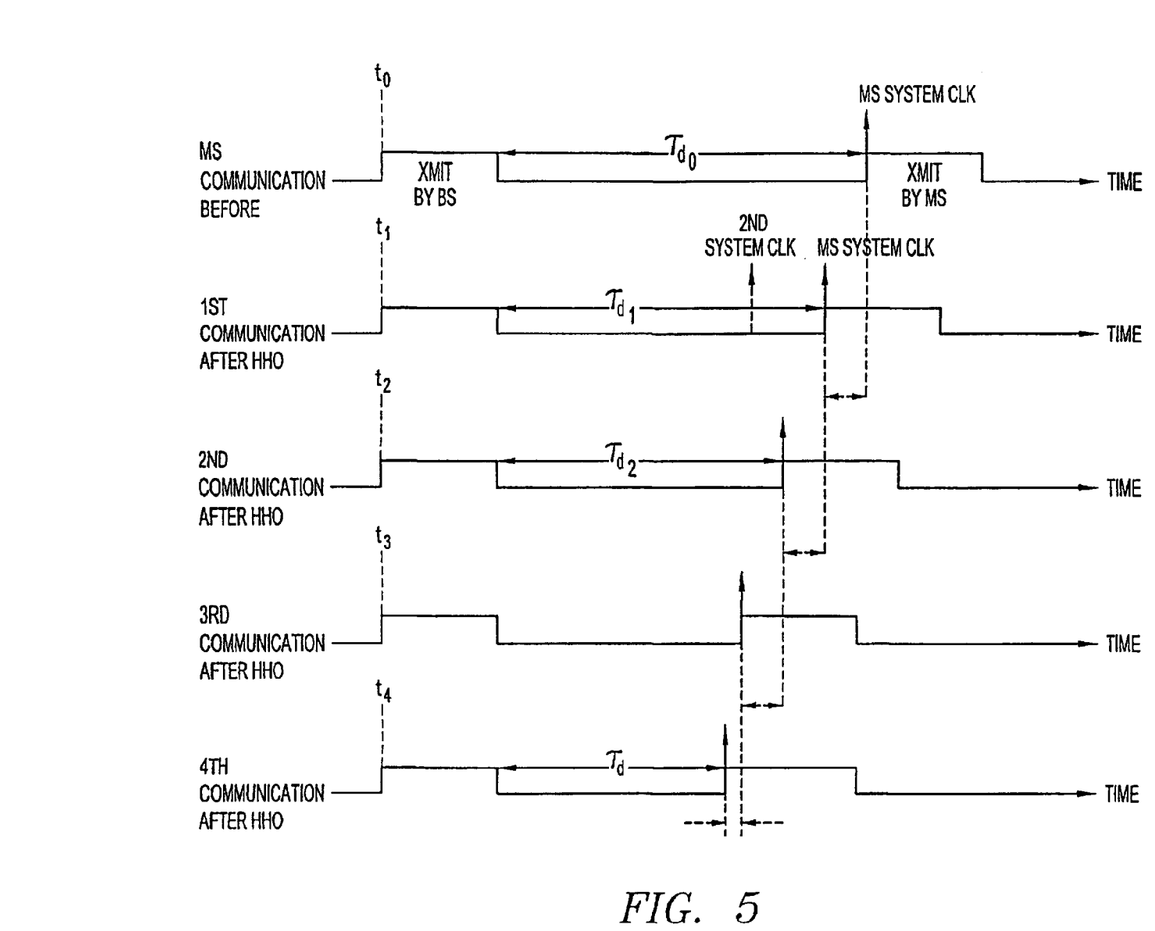
FIG. 5 is a timing diagram illustrating the timing of communications that are transmitted by communicating first and second cell base stations, and the mobile station.

FIG. 5 is a timing diagram illustrating the timing of communications that are transmitted by communicating first and second cell base stations 104/106, and the mobile station 102. Before the hard handoff (HHO), mobile station 102 communications are assigned to base station 104 of the first cell. At time t0 the first cell base station transmits a message. The mobile station 102 transmits a reply after a time delay, $\tau_{d0}$. A significant portion of the time delay is based on the time of arrival of the base station communication at the mobile station. Processing delays exist in the mobile station before its return transmission. However, these processing delays are relatively small and consistent in all communications. They will be ignored for the present discussion. At some time after t0 a determination is made that the mobile station call will be handed off to the base station 106 of cell 2.

Referring briefly to FIG. 3, it can be seen that distance from the mobile station 102 to the second cell base station 106 is less than the distance from the mobile station 102 to the first cell base station 104. Therefore, although the first communication after hard handoff is received (at the mobile station) significantly earlier that the communication received before hard handoff, the reply transmission is not. That is, the delay between the received message and the transmitted reply, $\tau_{d1}$, is approximately equal to $\tau_{d0}$. Conventionally, the mobile station does not instantaneously change from a first system clock, arbitrarily defined to be at the beginning the mobile station reply transmission, to a second system clock. The first mobile station system clock is defined to be the timing used by the mobile station in communications with the first base station and the second system clock is the timing the would be used by the mobile station in communications with the second base station, if the mobile station instantaneously changed its system clock.

Figure 6:
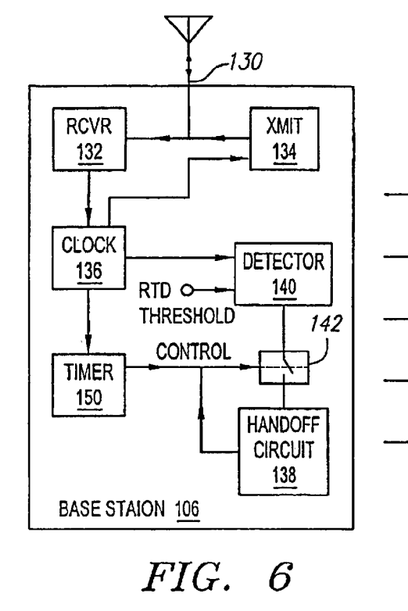
FIG. 6 illustrates a more detailed depiction of the base station of FIG. 3.

FIG. 6 illustrates a more detailed depiction of the base station 106 of FIG. 3. Second cell base station (BS) 106 has a port 130 connected to a receiver 132 and transmitter 134 to communicate with the mobile station 102 (not shown). The second cell base station has a clock 136 connected to the receiver 132 and transmitter 134 to measure message timing (see FIG. 5). A handoff circuit 138 negotiates mobile station handoffs with other cells, and a detector 140, connected to the clock 136, detects instabilities in the mobile station system clock. The detector 140 has an output connected to the handoff circuit 138 to suspend handing off the mobile station in response to detecting instabilities in the mobile station system clock. Preferably, a switch 142, selectively engages the detector circuit 140. The switch 142 has a switch control input connected to the handoff circuit 138 for selectively engaging the detector circuit 140.

Although the hysteresis introduction circuitry of base station 106 has been described as a combination of hardware blocks it should be understood that some, or all, of these hardware functions can be performed with software in a computer application of machine instructions. It should also be understood that other base stations in the same or other cells may be equipped with equivalent hysteresis circuitry.

Figure 7:
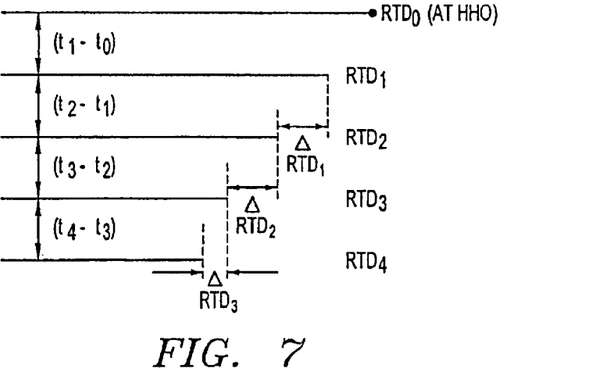
FIG. 7 illustrates round trip delay timing performed by the second cell base station of FIG. 6.

FIG. 7 illustrates round trip delay timing performed by the second cell base station 106 of FIG. 6. Specifically, the second cell base station detector 140 measures the slew rate of the mobile station system clock to determine instabilities. As shown below, slew rate is determined from RTD measurements. The second cell base station clock measures the round trip delay (RTD) between messages from the second cell base station to the mobile station. A calculation is performed to measure the difference between the two RTD measurements Then, the second cell base station detector calculates the rate of change in the difference calculation.

FIGS. 5 and 7 can be cross-referenced, with the first communication after hard handoff in FIG. 5 corresponding to $RTD_1$ in FIG. 7. Likewise, the second, third, and fourth communications after hard handoff in FIG. 5 correspond respectively to $RTD_2$, $RTD_3$, and $RTD_4$ in FIG. 7. The difference between the mobile station's system clock, as measured by the arrival of the mobile station transmitted messages at the base station, is the difference between $RTD_1$ and $RTD_2$, the calculation being the RTD difference, $\Delta RTD_1$. To calculate the rate of change in the RTD difference, the RTD difference is divided by the time between base station interrogations. For example, the time associated with the base station transmission that begins the first communication after hard handoff in FIG. 5 may be labeled t1, while the time associated with the base station transmission that begins the second communication after hard handoff may be labeled t2. Therefore, the RTD rate of change can be expressed as $\Delta RTD_1/(t2-t1)$.

As shown in FIG. 6, the second cell base station detector 140 has an input to accept a predetermined RTD rate of change threshold. Returning to FIG. 7, the second cell base station detector signals the handoff circuit to suspend a handoff of the mobile station when the RTD rate of change calculation exceeds the RTD rate of change threshold.

The mobile station is fabricated in accordance with standards that permit a range of acceptable system clock slew rates. Thus, the mobile station system clock (126, see FIG. 4) changes the system time at a predetermined first slew rate. The second cell base station detector must take this predetermined rate of slewing into consideration for maximum accuracy. That is, the acceptance of the RTD difference threshold includes accepting a first slew rate estimate, which is the assumed slew rate of the mobile station. The detector measures the actual mobile station slew rate in response to calculating the RTD difference and change rate. If the measured rate of change, or slew, is greater than the first slew rate estimate, the assumption is made that the mobile station system clock must be still in transition from the first system time to the second system time. Alternately, a measured slew rate that is be greater than, or equal to, the first slew rate estimate can trigger handoff hysteresis. The detector signals the handoff circuit to suspend a mobile station handoff when the measured slew rate exceeds the first slew rate estimate.

As is well known in the art, the base station and mobile station communications are spread with pseudo-noise (PN) chips at a PN chip rate. The PN chips rate provides a convenient frame of reference with which a slew rate can be measured. In some aspects of the invention, the mobile station is confined to operate with a slew rate in the range between 3/8 and 10/8 chips per second. Therefore, the second cell base station detector accepts a first slew rate estimate in the range between 3/8 and 10/8 chips per second.

The second cell base station detector expresses the RTD difference as a second number of chips. Then, the rate of change can be expressed as the second number of chips divided by the first time period. Returning briefly to FIG. 5, the first time period is defined as the time period between the first communication at the first time after hard handoff and the second communication at a second time after hard handoff. Alternately, the first time period is expressed as (t2−t1). As an alternative to comparing the first slew estimate and calculated slew rates, the first slew rate estimate can be converted to a first number of chips. The second cell base station detector multiplies the first slew rate estimate by the first period to yield the first number of chips. Then, the detector signals the handoff circuit to suspend mobile station handoffs when the second number of chips exceeds the first number of chips. In some aspects of the invention, the first slew rate is estimated to be 5/8 chips per second. Thus, if the detector measures a difference of 6 chips in a period of 8 seconds, the second number of chips is 6. The first number of chips is calculated by converting the first slew rate estimate with the first period, 5/8 chips per second×8 seconds=5 chips. Since the second number exceeds the first number, the mobile station system clock is assumed to be slewing. It should be understood that there are many methods of performing these calculations. The above calculation is an example of one such means.

Figure 8:
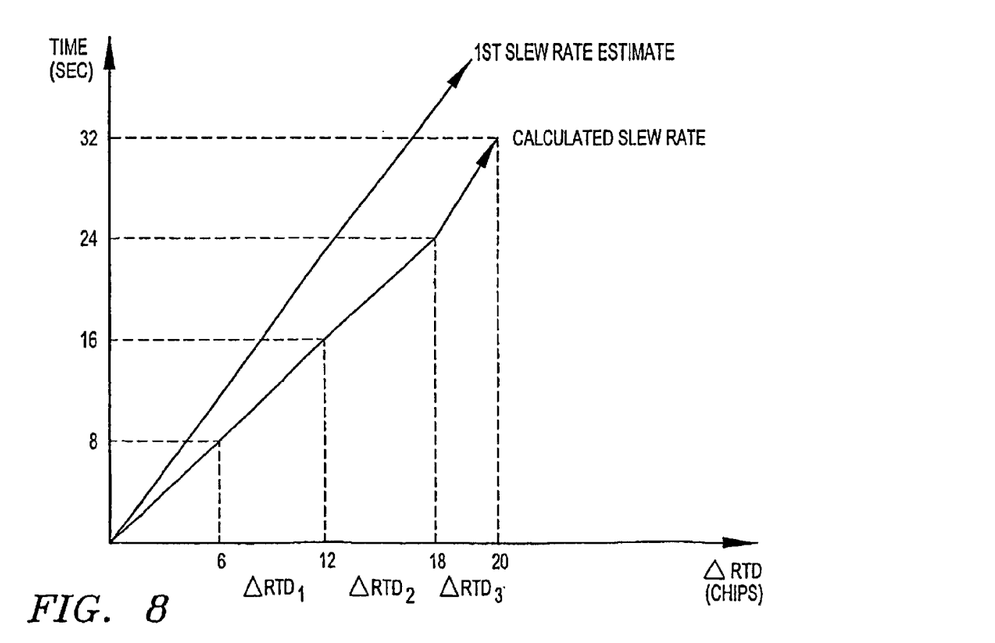
FIG. 8 is graph depicting another method of determining slew rate that is cross-referenced to FIGS. 5 and 7.

FIG. 8 is graph depicting another method of determining slew rate that is cross-referenced to FIGS. 5 and 7. One axis represents the difference between RTD measurements expressed in chips with $\Delta RTD_1$, $\Delta RTD_2$, and $\Delta RTD_3$, as explained above and shown in FIG. 7. The other axis is time, representing the time between RTD measurements. It is arbitrarily assumed that the first time period, and all subsequent time periods (t3–t2) and (t4–t3), are equal to eight seconds. Note, the time periods need not be equal. Six chips are measured in $\Delta RTD_1$ and $\Delta RTD_2$. Therefore, the calculated rate of change is 6/8 chips per second. Assuming the first slew rate estimate is 5/8 chips per second, the calculated slew rate exceeds the first slew rate estimate, and hard handoffs are suspended. Alternately, the graph can be consulted and the vectors associated with the first slew rate estimate (threshold) and calculated rates of changes can be compared. At $\Delta RTD_3$ only 2 chips are measured in a period of 8 seconds. The calculated slew rate of 2/8 is less than the threshold rate, and the second cell base station detector authorizes the handoff circuit to negotiate a hard handoff, if the hard handoff mechanism has been triggered. Alternately, the decision to authorize hard handoffs can be made by comparing the vector at $\Delta RTD_3$ to the first slew rate estimate vector.

The selection of the first slew rate estimate, the RTD rate of change threshold, is important in the accurate implementation of the invention. Movement by the mobile station can alter RTD measurements. A mobile station mounted in a rapidly moving car, for example, can appear to have a slewing system clock. If the slewing rate threshold is set too low, the RTD measurements associated with a rapidly moving car will prevent the base station detector from authorizing hard handoffs, even when the mobile station system clock is not slewing. If the slewing rate threshold is set too high, however, it becomes possible to misinterpret slewing in mobile stations that are fabricated with low slew rates. That is, slewing will not be recognized in a mobile station system clock that is slewing at a low rate of change, following a hard handoff. A first slew rate estimate of 5/8 chips per second is low enough to recognize most slewing, yet high enough that the mobile station must move at a speed of over one-hundred and thirty miles per hour to simulate slewing in the system clock.

Returning to FIG. 6, the second cell base station includes a mechanism to disable the detector 140 after a predetermined amount of time, to permit a hard handoff to occur despite the calculation of an RTD rate of change that exceeds the RTD rate of change threshold. A timer 150 has an input to accept a timer start signal once the second cell base station accepts the mobile station handoff from the first cell. The timer 150 has an output connected to the switch 142 to disengage the detector circuit 140. Then, the handoff circuit 138 is permitted to handoff the mobile station, after the timer 150 has reached the timer limit. In some aspects of the invention, the time limit is set to twenty-five seconds. Note that a fixed timer alone could be used to introduce hysteresis, instead of the above-described slew rate measurement method. However, this method would not permit a hard handoff to immediately occur after the mobile station system clock stopped slewing. There are situations where quick hard handoffs must occur to prevent the call from being dropped.

Figure 9A:
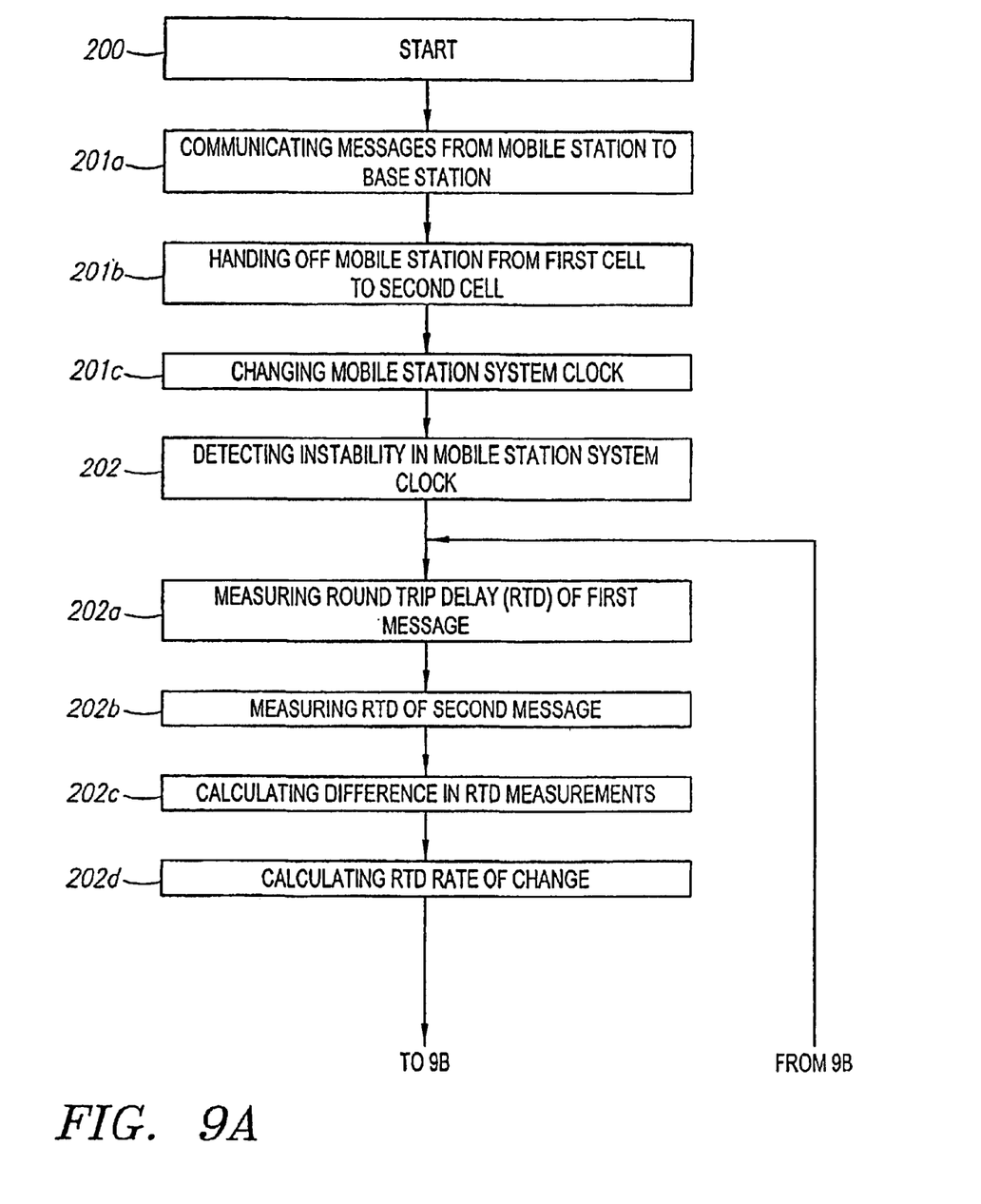
FIGS. 9a and 9b are a flowchart illustrating a method for introducing hysteresis into a call handoff in a CDMA communications system cell base station subsystem.
Figure 9B:
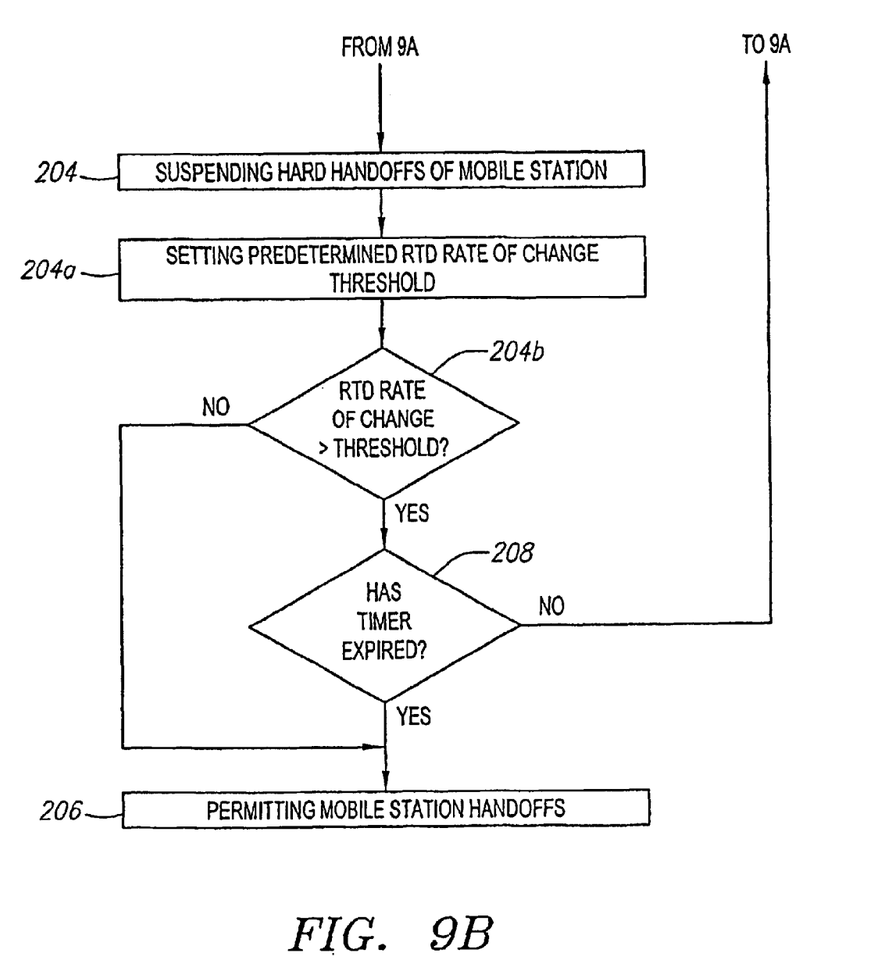

FIGS. 9a and 9b are a flowchart illustrating a method for introducing hysteresis into a call handoff in a CDMA communications system cell base station subsystem. The method can be embodied as software applications of machine instructions stored on an electrical storage medium operated by a computer in a base station controller (BSC) or base transceiver station (BTS). Although the process is depicted as a sequence of numbered steps for clarity, no order should be inferred from the numbering unless explicitly stated. The method starts at Step 200. Step 202 detects instability in a mobile station system clock. Step 204, in response to detecting the mobile station clock instability, suspends hard handoffs of the mobile station. Step 206 permits mobile station handoffs when no mobile station system clock instabilities are measured.

Preceding the detecting of a mobile station system clock instability in Step 202, Step 201a communicates messages from the mobile station to a base station in the first cell at a first system time. Step 201b hands off the mobile station from the first cell to a second cell. Following the hand off of the mobile station, Step 201c changes the mobile station system clock from the first system time to a second system time for communications to the second cell base station. Then, detecting the mobile station system clock instability in Step 202 includes a base station in the second cell detecting the mobile station system clock instability. Detecting instability in the mobile station system clock includes measuring the change in the mobile station system clock from the first system time to the second system time.

More specifically, the detecting the mobile station system clock instability in Step 202 includes the second cell base station measuring the slew rate of the mobile station system clock. Measuring the slew rate of the mobile station system clock in Step 202 includes sub-steps. Step 202a measures the round trip delay (RTD) of a first message at a first time, from the second cell base to the mobile station. Step 202b measures the RTD of a second message at a second time, from the second cell base to the mobile station. Step 202c calculates the difference in RTD measurements, and Step 202d calculates the RTD rate of change.

Likewise, suspending handoffs of the mobile station in Step 204 includes sub-steps. Step 204a accepts a predetermined RTD rate of change threshold. Step 204b suspends handoffs when the calculated RTD rate of change exceeds the RTD rate of change threshold.

In some aspects of the invention, changing the mobile station system time in Step 201c includes changing the system time at a predetermined first slew rate, and accepting the RTD rate of change threshold in Step 204a includes estimating the first slew rate. In response to calculating the RTD difference in Step 202c, Step 202d calculates the mobile station (measured) slew rate. Then, suspending the handoff of the mobile station in Step 204b includes suspending the handoff when the measured slew rate exceeds the first slew rate estimate.

In some aspects of the invention, communications to the mobile station are spread with a PN chips at a PN chip rate. Then, Step 204a includes estimating the mobile station first slew rate to be in the range between 3/8 and 10/8 chips per second. Calculating the RTD rate of change in Step 202c includes expressing the difference in RTD measurements as a second number of chips, and calculating the RTD rate of change in Step 202d includes expressing the RTD rate of change as the second number of chips occurring in a first time period, where the first time period is defined between the first communication at the first time and the second communication at the second time. Then, suspending handoffs to the mobile station in Step 204b includes suspending handoffs when the calculated RTD rate of change exceeds the first slew rate estimate.

Alternately, Step 204a includes expressing the slew rate threshold as the mobile station first slew rate estimate multiplied by the first time period to yield a first number of chips. Then, suspending handoffs to the mobile station in Step 204b includes suspending handoffs when the second number of chips exceeds the first number of chips. In some aspects, the mobile station first slew rate in Step 204a is estimated to be 5/8 chips per second.

In some aspects of the invention, following the hand off of the mobile station to the second cell in Step 201b, Step 201d starts a timer with a timer limit. Step 208, regardless of the detected mobile station system clock instabilities, permits mobile station handoffs after the timer has reached the timer limit.

Examples of software and hardware methods to introduce hysteresis into a hard handoff decision in CDMA communications, immediately following an initial hard handoff, have been presented above. The hysteresis is introduced in response to a calculation of the rate of change in the RTD. Examples of some RTD rate of change calculations are presented. However, the invention is applicable to any method of determining the slew rate in the system clock of the subject mobile station. Further embellishments could be added to account for the motion of the mobile station, especially when the mobile station or the communication system is equipped with position location equipment. Adjustment of the slew rate thresholds to account for motion in the mobile station would further increase the accuracy of the system. Other variations and embodiments will occur to those skilled in the art.

We claim:

1. In a code division multiple access (CDMA) base station subsystem, a method for introducing hysteresis in a call handoff, the method comprising:

detecting instability in a mobile station (MS) system clock by measuring a slew rate associated with the mobile station system timing; and in response to detecting the mobile station clock instability, suspending hard handoffs of the mobile station.

2. The method of claim 1 further comprising:

preceding the detecting of a mobile station system clock instability, handing off the mobile station from a first cell to a second cell; and wherein detecting the mobile station system clock instability includes a base station in the second cell detecting the mobile station system clock instability.

3. The method of claim 2 wherein measuring the slew rate of the mobile station system clock includes:

measuring the round trip delay (RTD) of a first message at a first time, from the second cell base station to the mobile station;

measuring the RTD of a second message at a second time, from the second cell base station to the mobile station;

calculating the difference in RTD measurements; and calculating the RTD rate of change.

4. The method of claim 3 wherein suspending handoffs of the mobile station in response to detecting the mobile station clock instability includes:

accepting a predetermined RTD rate of change threshold; and suspending handoffs if the calculated RTD rate of change exceeds the RTD rate of change threshold.

5. The method of claim 4 further comprising:

preceding the handing off of the mobile station from the first cell to the second cell, communicating messages from the mobile station to a base station in the first cell at a first system time;

following the handing off of the mobile station from the first cell to the second cell, changing the mobile station system clock from the first system time to a second system time for communications to the second cell base station; and wherein detecting instability in the mobile station system clock includes measuring the change in the mobile station system clock from the first system time to the second system time.

6. The method of claim 5 wherein changing the mobile station system time includes changing the system time at a first predetermined slew rate;

wherein accepting the RTD rate of change threshold includes determining a first slew rate estimate for the first predetermined slew rate;

wherein detecting instability in the mobile station system clock includes:

in response to calculating the RTD difference, calculating the mobile station measured slew; and wherein suspending the handoff of the mobile station includes suspending the handoff if the measured slew rate exceeds the first slew rate estimate.

7. The method of claim 6 in which communications to the mobile station are spread with a PN chips at a PN chip rate;

wherein the mobile station first slew rate is estimated to be in the range between 3/8 and 10/8 chips per second;

wherein calculating the RTD difference includes expressing the difference in RTD measurements as a second number of chips;

wherein calculating the RTD rate of change includes expressing the RTD rate of change as the second number of chips occurring in a first time period, where the first time period is defined between the first communication at the first time and the second communication at the second time; and wherein suspending handoffs to the mobile station includes suspending handoffs if the calculated RTD rate of change exceeds the first slew rate estimate.

8. The method of claim 7 wherein the mobile station first slew rate estimate is multiplied by the first time period to calculate a first number of chips; and wherein suspending handoffs to the mobile station includes suspending handoffs if the second number of chips exceeds the first number of chips.

9. The method of claim 7 wherein the mobile station first slew rate is estimated to be 5/8 chips per second.

10. The method of claim 1 further comprising:

following the handing off the mobile station to the second cell, starting a timer with a timer limit; and regardless of the detected mobile station system clock instabilities, permitting mobile station handoffs after the timer has reached the timer limit.

11. The method of claim 1 further comprising:
permitting mobile station handoffs if no mobile station system clock instabilities are measured.

12. In code division multiple access (CDMA) communications, a system for introducing hysteresis into call handoff, the system comprising:
a mobile station (MS) having a port connected to a receiver and a transmitter for the communication of messages, the mobile station having a system clock connected to the transmitter and receiver for initiating message transmission in response to receiving messages; and
a base station (BS) located in a second cell having a port connected to a receiver and transmitter to communicate with the mobile station, the second cell base station having a clock connected to the receiver and transmitter to measure message timing, a handoff circuit to negotiate mobile station handoffs with other cells and a detector connected to the clock to detect instabilities in the mobile station system clock, the detector having an output connected to the handoff circuit to suspend handing off the mobile station in response to detecting instabilities in the mobile station system clock.

13. The system of claim 12 further comprising:
a second cell base station switch having a switch control input connected to the handoff circuit for selectively engaging the detector circuit measurement of mobile station system clock instabilities in response to the second cell base station receiving the mobile station handoff from a first cell.

14. The system of claim 13 wherein the second cell base station detector measures a slew rate of the mobile station system clock.

15. The system of claim 14 wherein the second cell base station clock measures the round trip delay (RTD) between messages from the second cell base station to the mobile station; and
wherein the second cell base station detector calculates the difference between RTD measurements and the RTD rate of change.

16. The system of claim 15 wherein the second cell base station detector has an input to accept a predetermined RTD rate of change threshold; and
wherein the second call base station detector signals the handoff circuit to suspend a handoff of the mobile station if the RTD rate of change calculation exceeds the RTD rate of change threshold.

17. The method of claim 16 further comprising:
a base station located In the first cell having a port connected to a receiver and a transmitter to communicate with the mobile station;
wherein the mobile station system clock changes system time in response to being handed off from the first cell base station to the second cell base station; and
wherein the second cell base station detector measures the change in the mobile station system clock.

18. The system of claim 17 wherein the mobile station system clock changes the system time at a first predetermined slew rate; and
wherein the second cell base station detector acceptance of the RTD difference threshold includes accepting a first slew rate estimate for the first predetermined slew rate, the detector measuring the mobile station slew rate in response to calculating the RTD rate of change, and signaling the handoff circuit to suspend a mobile station handoff if the measured slew rate exceeds the first slew rate estimate.

19. The system of claim 18 wherein base station and mobile station communications are spread with pseudo-noise (PN) chips at a PN chip rate;
wherein the second cell base station detector accepts a first slew rate estimate in the range between 3/8 and 10/8 chips per second;
wherein the second cell base station expresses RTD difference measurements as a second number of chips;
wherein the second cell base station calculates the RTD rate of change by expressing the RTD rate of change as the second number of chips occurring in a first time period where the first time period is defined between the first communication at the first time and the second communication at the second time; and
wherein the second cell base station suspends handoffs to the mobile station if the calculated RTD rate of change exceeds the first slew rate estimate.

20. The system of claim 19 wherein the second cell base station multiplies the mobile station first slow rate estimate by the first time period to calculate a first number of chips; and
wherein the second cell base station suspends handoffs to the mobile station if the second number of chips exceeds the first number of chips.

21. The system of claim 19 wherein the first slew rate is estimated to be 5/8 chips per second.

22. The system of claim 13 further comprising:
a second cell base station timer having an Input to accept a timer start signal once the second call base station accepts the mobile station handoff from the first cell, and having an output connected to the switch to disengage the detector circuit; and
wherein the handoff circuit is permitted to handoff the mobile station after the time has reached the timer limit.

23. In a code division multiple access (CDMA) base station including a receiver and a transmitter to communicate messages associated with a call, circuitry for introducing hysteresis in a handoff of the call between cells, the circuitry comprising:
a clock connected to the receiver and the transmitter to measure message timing;
a handoff circuit to negotiate call handoffs with other cells; and
a detector connected to the clock to detect an instability of system timing associated with the messages received from a mobile station, the detector having an output connected to the handoff circuit to suspend handing off the call in response to detecting the system timing instability, wherein the detector detects the system clock instability by measuring a slew rate associated with the received message system timing.

24. The circuitry of claim 23 further comprising:
a switch having a control input connect to the handoff circuit to selectively engage the detector circuit, the handoff circuit signaling the switch to engage the detector in response to the station receiving a call handoff.

25. The circuitry of claim 24 further comprising:
a timer having an input to accept a timer start signal following the acceptance of a call handoff from another cell, the timer having an output connected to the switch to disengage the detector circuit; and
wherein the handoff circuit is permitted to handoff the mobile station after the timer has reached the timer limit.

26. The circuitry of claim 23 wherein the clock measures the round trip delay (RTD) between transmitted and received messages; and wherein the detector calculates the difference between RTD measurements and the RTD rate of change.

27. The circuitry of claim 26 wherein the detector has an input to accept a predetermined RTD rate of change threshold; and wherein the detector signals the handoff circuit to suspend a call handoff if the RTD rate of change calculation exceeds the RTD rate of change threshold.

28. The circuitry of claim 27 in which the system timing of received messages changes in response to being handed off from another cell; and wherein the detector measures the change in the system timing.

29. The circuitry of claim 28 in which the system timing of the received messages changes at a first predetermined slew rate; and wherein the detector's acceptance of the RTD difference threshold includes accepting a first slew rate estimate for the first predetermined slew rate, measuring the slew rate associated with the received messages in response to calculating the RTD rate of change, and signaling the handoff circuit to suspend a call handoff if the measured slew rate exceeds the first slew rate estimate.

30. The circuitry of claim 29 in which the transmitted and received messages are spread with pseudo-noise (PN) chips at a PN chip rate;

wherein the detector has an input to accepts a first slew rate estimate in the range between 3/8 and 10/8 chips per second;

wherein the detector expresses the difference in RTD measurements as a second number of chips;

wherein the detector calculates the RTD rate of change by expressing the RTD rate of change as the second number of chips occurring in a first time period, where the first time period is defined between the first communication at the first time and the second communication at the second time; and wherein the detector suspends handoffs if the calculated RTD rate of change exceeds the first slew rate estimate.

31. The circuitry of claim 30 wherein the detector multiplies the first slew rate estimate by the first time period to calculate a first number of chips; and wherein the detector suspends handoffs if the second number of chips exceeds the first number of chips.

32. The circuitry of claim 30 wherein the detector accepts a first slew rate estimate of 5/8 chips per second.

* * * * *